United States Patent [19]

Sakiyama et al.

[11] Patent Number: 5,952,087
[45] Date of Patent: Sep. 14, 1999

[54] CALCIUM SILICATE BOARD AND METHOD OF MANUFACTURE THEREFOR

[75] Inventors: Masato Sakiyama; Takuya Asami; Tomoki Iwanaga; Yasuhide Oshio; Masaaki Oda, all of Kanagawa, Japan

[73] Assignee: ASK Corporation, Yokohama, Japan

[21] Appl. No.: 09/136,413

[22] Filed: Aug. 19, 1998

Related U.S. Application Data

[62] Division of application No. 08/805,572, Feb. 25, 1997, Pat. No. 5,851,354.

[30] Foreign Application Priority Data

Apr. 22, 1996 [JP] Japan .................................. 8-100320

[51] Int. Cl.$^6$ .............................. B32B 5/26; B32B 13/02; B32B 13/04
[52] U.S. Cl. .................. 428/294.7; 162/123; 162/181.1; 428/703; 442/326
[58] Field of Search ................................ 428/294.7, 703; 442/326; 162/123, 181.1

[56] References Cited

U.S. PATENT DOCUMENTS

| | | |
|---|---|---|
| 3,902,913 | 9/1975 | Heiser et al. . |
| 4,389,359 | 6/1983 | Brunt et al. . |
| 5,188,889 | 2/1993 | Nagatomi et al. . |
| 5,256,349 | 10/1993 | Sato et al. . |
| 5,851,354 | 12/1998 | Sakiyama et al. ...................... 162/123 |

FOREIGN PATENT DOCUMENTS

| | | |
|---|---|---|
| 2 243 914 | 4/1975 | France . |
| 6 287 083 | 10/1994 | Japan . |
| 8-231261 | 9/1996 | Japan . |
| 8-253375 | 10/1996 | Japan . |
| 8-333179 | 12/1996 | Japan . |
| 9-20576 | 1/1997 | Japan . |

OTHER PUBLICATIONS

Patent Abstracts of Japan, AN 07 140699, vol. 097, No. 002, Feb. 28, 1997, JP 08 253375, Oct.1, 1996.
Chemical Abstracts, AN 139950n, vol. 84, No.20, p. 301, May 17, 1996, JP 75 151 930, Dec. 6, 1975.
Derwent Abstracts, AN 93–030938, JPA 04 357 182, Dec. 10, 1992.

*Primary Examiner*—Blaine R. Copenheaver
*Attorney, Agent, or Firm*—Oblon, Spivak, McClelland, Maier & Neustadt, P.C.

[57] ABSTRACT

The object of the present invention is to improve the overall strength and interlaminar strength of a compact (green sheet) before hydrothermal reaction by using alunites, alums and aluminum sulfate having a specified specific surface area which does not require the addition of a setting retarder or a curing accelerator together with a curing agent in order to provide a method of manufacture for a lightweight calcium silicate board which does not give rise to interlaminar peeling or bursting during hydrothermal reaction and to provide such a calcium silicate board. The method of manufacture for a calcium silicate board according to the present invention is characterized by use of one or more species selected from alunites and alums with a Blaine specific surface area of 4000 $cm^2/g$ or more or aluminum sulfate with a Blaine specific surface area of 2000 $cm^2/g$ or more.

1 Claim, 1 Drawing Sheet

CALCIUM SILICATE BOARD AND METHOD OF MANUFACTURE THEREFOR

This application is a division of application Ser. No. 08/805,572 filed Feb. 25, 1997 now U.S. Pat. No. 5,851,354.

BACKGROUND OF THE INVENTION

1. Field of the Invention

The present invention relates to a calcium silicate board and a method of manufacture therefor, and in particular a lightweight (i.e., bulk specific gravity of 1.0 or less) calcium silicate board and a method of manufacture therefor.

2. Description of the Prior Art

Conventionally, calcium silicate boards have been widely used as a building material, chiefly for interior trimmings, because they are light, exceptionally easy to work with and dimensionally stable, and they are nonflammable. The molding processes for calcium silicate boards include Hatschek sheet machine process, press molding, and single layer molding, and the calcium silicate boards are manufactured from a compact formed from a raw material slurry, containing calcareous material, siliceous material, and inorganic filler, generally by reacting and curing the compact with saturated water vapor in a pressure vessel.

However, when manufacturing lightweight calcium silicate boards, particularly using the Hatschek sheet machine process, the interlaminar bonding within the compact is weak before hydrothermal reaction and the water content is high. During hydrothermal reaction, this gives rise to thermal expansion of excess water and high vapor pressure, which in turn leads to problems of interlaminar peeling and bursting.

Some of the methods used to overcome these problems are pressing the compact after molding and then subjecting it to hydrothermal reaction, or using a turnbuckle to squeeze the compact during hydrothermal reaction, but employment of these methods increases the bulk specific gravity and also increases labor requirements.

Japanese Patent Laid-Open No. 6-287083 discloses a method of removing excess water, but this method cannot be commonly used because it requires a special container or a vapor heater.

In addition in Japanese Patent Application Nos. 6-323225 and 7-5013 the inventors of the present invention have proposed methods in which amorphous siliceous material or silicate material, which reacts well with the calcareous material, is used as part of the siliceous material, or a curing agent such as Portland cement or granulated blast furnace slag is added, but these methods use expensive materials and increase the bulk specific gravity.

Further, the inventors of the present invention have proposed production methods for lightweight calcium silicate boards in which the strength of the compact (green sheet) before hydrothermal reaction and the interlaminar strength thereof is increased without the addition of siliceous material or silicate material or of curing agents such as Portland cement or granulated blast furnace slag, by using hemihydrate gypsum (Japanese Patent Appln. No. 7-138040) or anhydrous gypsum (Japanese Patent Appln. No. 7-169951) and interlaminar peeling or bursting does not occur during hydrothermal reaction.

However, when hemihydrate gypsum is used as a curing agent hydration occurs extremely quickly if the hemihydrate gypsum is used in slurry form and it becomes necessary to add a setting retarder to the slurry. And when anhydrous gypsum is used as a curing agent it becomes necessary to add a curing accelerator to the slurry, but adding setting retarders and curing accelerators and controlling the amounts added has made the manufacturing process for calcium silicate boards complicated.

SUMMARY OF THE INVENTION

Thus, the objects of the present invention are to provide a method of manufacture for a lightweight calcium silicate board which does not peel or burst during hydrothermal reaction by using alunites, alums, or aluminum sulfate having a specific surface area not requiring the addition of setting retarders or curing accelerators to the curing agent to increase the strength of the compact (green sheet) before hydrothermal reaction and the interlaminar strength thereof, and to provide such lightweight calcium silicate boards.

The present invention provides a method of manufacturing a lightweight calcium silicate board consisting of hydrothermally reacting in a pressure vessel a compact obtained by laminating, using the Hatschek sheet machine process, a raw material slurry containing as its solid content 17 to 50 percent by weight of calcareous material, 15 to 45 percent by weight of siliceous material, 2 to 8 percent by weight of fibrous material, and 5 to 40 percent by weight of inorganic fillers, characterized in that said raw material slurry contains 2 to 20 percent by weight of one or more species selected from alunites and alums with a Blaine specific surface area of 4000 $cm^2/g$ or more or aluminum sulfate with a Blaine specific surface area of 2000 $cm^2/g$ or more, and the compact obtained by Hatschek sheet machine process is subjected to primary curing under conditions where $$(\text{curing temperature}-15° \text{C.})\times\text{curing time} \geq 120° \text{C.·hr} \qquad (1)$$

and is then hydrothermally reacted.

Further, the present invention provides a method of manufacturing a lightweight calcium silicate board consisting of hydrothermally reacting in a pressure vessel a compact obtained by laminating, using the Hatschek sheet machine process, a raw material slurry containing as its solid content 17 to 50 percent by weight of calcareous material, 15 to 45 percent by weight of siliceous material, 2 to 8 percent by weight of fibrous material, and 5 to 40 percent by weight of inorganic fillers, characterized in that at least one of the slurries in the first and last slurry tanks of a cylinder mesh type Hatschek sheet machine is said raw material slurry with 2 to 20 percent by weight of one or more species selected from alunites and alums with a Blaine specific surface area of 4000 $cm^2/g$ or more or aluminum sulfate with a Blaine specific surface area of 2000 $cm^2/g$ or more added to it, and the compact obtained by Hatschek sheet machine process is subjected to primary curing under conditions where $$(\text{curing temperature}-15° \text{C.})\times\text{curing time} \geq 120° \text{C.·hr} \qquad (1)$$

and is then hydrothermally reacted.

In addition, the present invention provides a method of manufacturing a lightweight calcium silicate board consisting of hydrothermally reacting in a pressure vessel a compact obtained by laminating, using the Hatschek sheet machine process, a raw material slurry containing as its solid content 17 to 50 percent by weight of calcareous material, 15 to 45 percent by weight of siliceous material, 2 to 8 percent by weight of fibrous material, and 5 to 40 percent by weight of inorganic fillers, characterized in that one or more species selected from alunites and alums with a Blaine specific surface area of 4000 $cm^2/g$ or more or aluminum sulfate with a Blaine specific surface area of 2000 $cm^2/g$ or more is or are applied to the extracted film in a powder or slurry form at a rate of 3 to 50 $g/m^2$ by dry solid content between the making roll and the return roll of the Hatschek sheet machine until the laminate attains a specific thickness, and then the compact obtained by Hatschek sheet machine process is subjected to primary curing under conditions where $$\text{(curing temperature}-15°\text{ C.)} \times \text{curing time} \geq 120°\text{ C.·hr} \qquad (1)$$

and is then hydrothermally reacted.

Further, the present invention provides a method of manufacturing a lightweight calcium silicate board consisting of hydrothermally reacting in a pressure vessel a compact obtained by laminating, using the Hatschek sheet machine process, a raw material slurry containing as its solid content 17 to 50 percent by weight of calcareous material, 15 to 45 percent by weight of siliceous material, 2 to 8 percent by weight of fibrous material, and 5 to 40 percent by weight of inorganic fillers, characterized in that the slurry in either the first or the last slurry tank of a cylinder mesh type Hatschek sheet machine process contains more than 20 percent by weight but less than 98 percent by weight of one or more species selected from alunites and alums with a Blaine specific surface area of 4000 $cm^2/g$ or more or aluminum sulfate with a Blaine specific surface area of 2000 $cm^2/g$ or more, 2 to 8 percent by weight of fibrous material, and less than 78 percent by weight of one or more species selected from a group consisting of calcareous material and inorganic fillers, and is extracted within the scope of $$(a)/(b) \times 100 = 1 \text{ to } 10 \qquad (2)$$

and $$(a)/(b) \times 100 \times (c) = 50 \text{ to } 400 \qquad (3)$$

wherein (a) is the extracted thickness of said slurry, (b) is the total extracted thickness extracted by the felt of a cylinder mesh type Hatschek sheet machine in one revolution, and (c) is the ratio (in percent by weight) of alunites, alums and aluminum sulfate in said slurry, and the compact obtained by Hatschek sheet machine process is subjected to the primary curing under conditions where $$\text{(curing temperature}-15°\text{ C.)} \times \text{curing time} \geq 120°\text{ C.·hr} \qquad (1)$$

and is then hydrothermally reacted.

In addition, the present invention provides a lightweight calcium silicate board (hereinafter simply "calcium silicate board") characterized in that it is a calcium silicate board manufactured according to one of the above manufacturing methods and its interlaminar peeling strength is at least 3 percent of its flexural strength.

PREFERRED EMBODIMENTS

Figure 1:
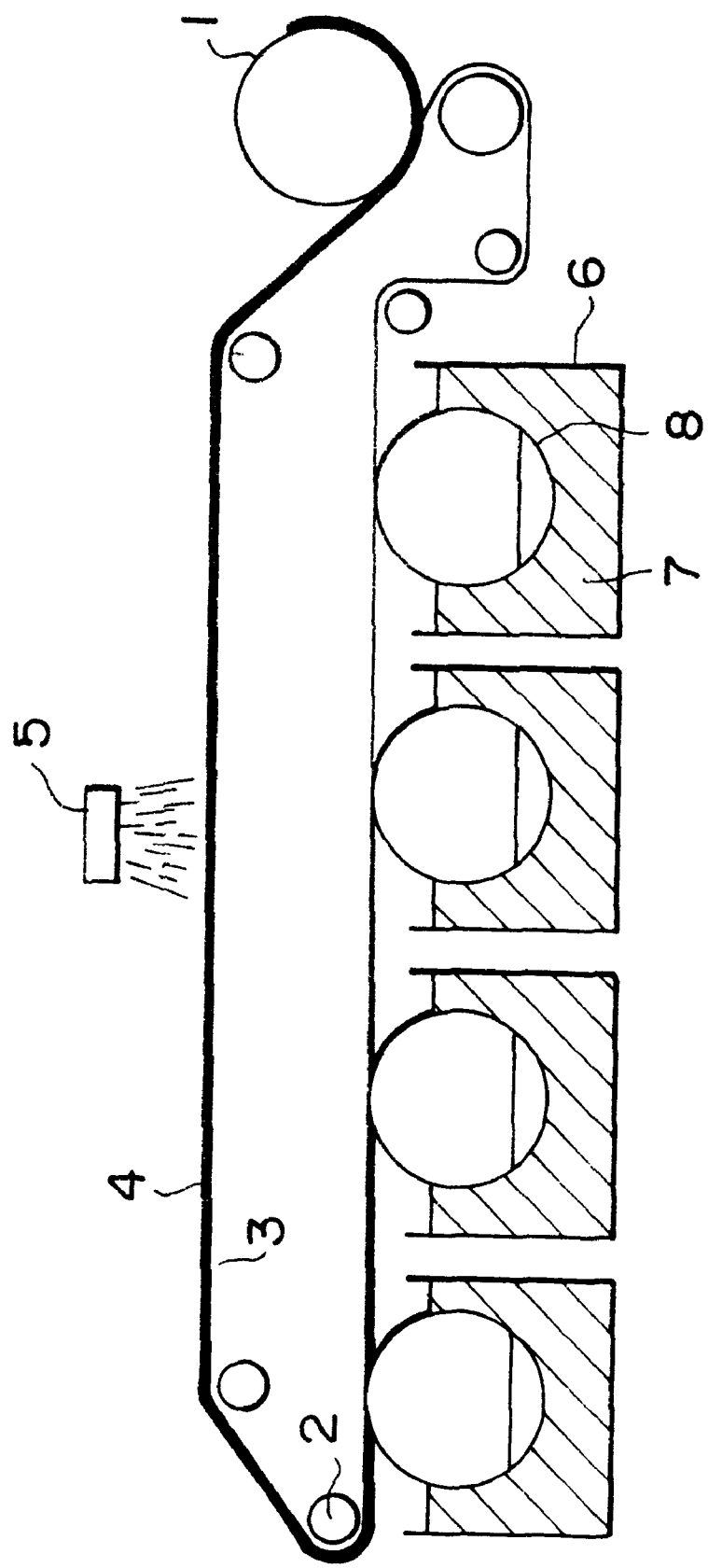
FIG. 1 is an illustration of one example of a cylinder mesh type Hatschek sheet machine which could be used for the third embodiment of the present invention.

The basic composition of the raw material slurry used in the method of manufacture of calcium silicate boards according to the present invention is a conventional one containing 17 to 50 percent by weight of calcareous material, 15 to 45 percent by weight of siliceous material, 2 to 8 percent by weight of fibrous material, and 5 to 40 percent by weight of inorganic fillers as its solid content.

Here, examples of the calcareous material that can be used include, for example, slaked lime or quicklime. It is not desirable for the proportion of calcareous material to be less than 17 percent by weight or greater than 50 percent by weight because flexural strength diminishes and dimensional variance increases due to water absorption.

Further, examples of the siliceous material that can be used include, for example, silica sand, diatomaceous earth, or fly ash. It is not desirable for the proportion of siliceous material to be less than 15 percent by weight or greater than 45 percent by weight because flexural strength diminishes and dimensional variance increases due to water absorption.

Further, within the ratios given above for calcareous and siliceous materials 2 to 20 percent by weight of calcareous material and 2 to 25 percent by weight of siliceous material can be used in gel form. An example of gelation conditions would be 75 to 180° C. for 1.5 to 4 hours.

In addition, examples of the fibrous material that can be used include, for example, cellulose fiber, polypropylene, vinylon, glass fiber, carbon fiber and the like. It is not desirable for the ratio of fibrous material to be less than 2 percent by weight because flexural strength diminishes, or to be greater than 8 percent by weight because flame resistance is lost. Further, it is desirable to keep the ratio of polypropylene, vinylon, glass fiber, carbon fiber and the like at 5 percent by weight or less if they are used.

Further, examples of the inorganic fillers that can be used include, for example, perlite, wollastonite, mica, talc, calcium carbonate, gypsum and the like. It is not desirable for the ratio of inorganic fillers to be less than 5 percent by weight because dimensional variance increases due to water absorption, or to be greater than 40 percent by weight because flexural strength diminishes.

The method of manufacturing a calcium silicate board according to the present invention is characterized by the following four processes:

According to the method of manufacture as it relates to the first embodiment of the present invention, it is possible to manufacture a calcium silicate board by adding 2 to 20 percent by weight of one or more species selected from alunites and alums with a Blaine specific surface area of 4000 $cm^2/g$ or more or aluminum sulfate with a Blaine specific surface area of 2000 $cm^2/g$ or more to a raw material slurry having the previously mentioned ratio of components, and laminating and molding said raw material slurry using the Hatschek sheet machine process, next inducing the calcium originally contained in the calcareous material to react with the alunites, alums, and/or aluminum sulfate by primary curing of the compact thus obtained, and then subjecting the compact to hydrothermal reaction.

In other words, the raw material slurry used in the first embodiment contains as its solid content 17 to 50 percent by weight of calcareous material, 15 to 45 percent by weight of siliceous material, 2 to 8 percent by weight of fibrous material, and 5 to 40 percent by weight of inorganic fillers, and 2 to 20 percent by weight of one or more species selected from alunites and alums with a Blaine specific surface area of 4000 $cm^2/g$ or more or aluminum sulfate with a Blaine specific surface area of 2000 $cm^2/g$ or more. Here, it is not desirable for the ratio of alunites, alums, and/or aluminum sulfate to be less than 2 percent by weight because the interlaminar strength of the green sheet is poor, or to be greater than 20 percent by weight because flexural strength diminishes. An addition of 5 to 15 percent by weight is preferable.

In the present invention, alunites with a Blaine specific surface area of 4000 $cm^2/g$ or more means alunites containing potassium and/or sodium. It is not desirable for the Blaine specific surface area of the alunites to be less than 4000 $cm^2/g$ because reactivity with the calcium from the calcareous material is poor, the strength of the green sheet is insufficient, and peeling occurs. Further, alums with a Blaine specific surface area of 4000 $cm^2/g$ or more means alums containing potassium and/or sodium. It is not desirable for the Blaine specific surface area of the alunites to be less than 4000 cm²/g because reactivity with the calcium from the calcareous material is poor, the strength of the green sheet is insufficient, and peeling occurs. In addition, it is not desirable for the Blaine specific surface area of the aluminum sulfate to be less than 2000 cm²/g because reactivity with the calcium from the calcareous material is poor, the strength of the compact (green sheet) immediately after the Hatschek sheet machine process is insufficient, and peeling occurs.

According to the first embodiment of the present invention, a raw material slurry having the above composition is used to make a compact (green sheet) by the Hatschek sheet machine process. Any conventional process can be substituted for the Hatschek sheet machine process and the invention is not limited thereto.

In the first embodiment of the present invention, the compact obtained in the above manner is not immediately subjected to hydrothermal reaction, it is first cured. Primary curing is carried out under the following conditions:

$$(\text{curing temperature}-15°\ \text{C.})\times\text{curing time}\geq 120°\ \text{C.}\cdot\text{hr} \qquad (1)$$

Here, it is not desirable for the primary curing conditions, i.e., the value of equation (1), to be less than 120° C.·hr because the compact cannot attain sufficient strength due to inadequate curing. Primary curing requires a curing temperature greater than 15° C. and it is preferable to carry out primary curing under conditions of 180° C.·hr with the curing temperature in the range of 30 to 80° C.

After the compact has been subjected to primary curing under the aforementioned conditions, it can be made into a calcium silicate board by hydration under conventional hydrothermal conditions and subsequent conventional processing. Hydrothermal reaction can be carried out in a pressure vessel under saturated water vapor pressure at 150 to 200° C., and preferably at 170 to 190° C., for 5 to 20 hours, preferably for 8 to 12 hours.

Next, according to the method of manufacture as it relates to the second embodiment of the present invention, it is possible to manufacture a calcium silicate board by laminating and molding a raw material slurry having the basic composition mentioned above using the Hatschek sheet machine process with at least one of the slurries in the first and last slurry tanks of a cylinder mesh type Hatschek sheet machine being the aforementioned raw material slurry with 2 to 20 percent by weight of one or more species selected from alunites and alums with a Blaine specific surface area of 4000 cm²/g or more or aluminum sulfate with a Blaine specific surface area of 2000 cm²/g or more added to it, next hydrating the alunites, alums, and/or aluminum sulfate by primary curing of the compact obtained using the Hatschek sheet machine process, and then subjecting the compact to hydrothermal reaction.

In other words, in the second invention a slurry of similar composition to the raw material slurry used in the aforementioned first invention is used as the slurry in the first and/or last slurry tanks of a cylinder mesh type Hatschek sheet machine. Here, it is not desirable for the ratio of alunites, alums, and/or aluminum sulfates in the slurry used in the first and/or last slurry tanks to be less than 2 percent by weight of the solid content because the interlaminar strength of the green sheet manifests itself poorly, or to be greater than 20 percent by weight because flexural strength diminishes.

According to the second invention of the subject invention, a slurry made by adding alunites, alums, and/or aluminum sulfates to a raw material slurry of basic composition is placed in the first and/or last slurry tanks of a cylinder mesh type Hatschek sheet machine and laminated and molded using the Hatschek sheet machine process. The placement of this slurry into the first and/or last slurry tanks of the Hatschek sheet machine is not limited in any way and, for example, a slurry with a different mixture ratio may be made in another box and transferred from a specialized chest, or the alunites, alums, and/or aluminum sulfates can be added to another slurry in a conduit between the chest and the slurry tank.

Next, according to the method of manufacture as it relates to the third embodiment of the present invention, it is possible to manufacture a calcium silicate board by laminating and molding a raw material slurry having the basic composition mentioned above using the Hatschek sheet machine process, applying alunites, alums, and/or aluminum sulfate to the extracted film in a powder or slurry form at a rate of 3 to 50 g/m² by dry solid content between the making roll and the return roll of the Hatschek sheet machine until the laminate attains a specific thickness, next hydrating the alunites, alums, and/or aluminum sulfate by primary curing of the compact obtained using the Hatschek sheet machine process, and then subjecting the compact to hydrothermal reaction.

It is not desirable for the distribution of alunites, alums, and/or aluminum sulfates to be less than 3 g/m² by dry solid content because the interlaminar strength of the green sheet is poor, or for said distribution to be greater than 50 g/m² because a layer of alunites, alums, and/or aluminum sulfates forms, cracks develop on drying, and flexural strength diminishes.

Further, the concentration of dry solid content in the distributing slurry is not limited in any way, but it is preferable for concentration of dry solid content to be slightly higher than the concentration of dry solid content of slurry generally used in the Hatschek sheet machine process, usually 5 to 20 percent by weight but preferably 8 to 15 percent by weight.

An example of a cylinder mesh type Hatschek sheet machine which could be used in the third embodiment of the present invention is shown in FIG. 1. According to this cylinder mesh type Hatschek sheet machine, a green sheet is made by transferring a slurry (7) to a continuous extractor felt support (3) by a rotatable circular mesh cylinder (8) disposes in a slurry tank (6) of a series of slurry tanks operation being repeated as many times as there are slurry tanks (or circular mesh cylinders) over which and in contact with which the extractor felt passes to form an extracted film (4), then winding this extracted film (4) around a making roll (1) a specific number of times until it attains a specific thickness, and cutting it. Because peeling and bursting generally occurs between the successive layers of film superposed on each other on the making roll (1), it is possible to improve the adhesion (interlaminar strength) between said layers of film, and thus prevent pealing and bursting, by disposing an application device (5) between the return roll (2) and the making roll (1) and applying alunites, alums, and/or aluminum sulfate in a powder or slurry form.

Next, according to the method of manufacture as it relates to the fourth embodiment of the present invention, it is possible to manufacture a calcium silicate board by laminating and molding a raw material slurry having the basic composition mentioned above using the Hatschek sheet machine process with the slurry in either the first or the last slurry tank of a cylinder mesh type Hatschek sheet machine containing more than 20 percent by weight but less than 98 percent by weight of alunites, alums and/or aluminum sulfate, 2 to 8 percent by weight of fibrous material, and less than 78 percent by weight of one or more species selected from a group consisting of calcareous material and inorganic fillers, being extracted within the scope of $$(a)/(b)\times 100 = 1\ \text{to}\ 10 \qquad (2)$$

and $$(a)/(b)\times 100\times (c) = 50\ \text{to}\ 400 \qquad (3)$$

wherein (a) is the extracted thickness of said slurry, transferred to the felt by a cylinder in a slurry tank (b) is the total extracted thickness extracted by the felt of a cylinder mesh type Hatschek sheet machine in one revolution of the felt, and (c) is the ratio (in percent by weight) of alunites, alums and aluminum sulfate in said slurry, next hydrating the alunites, alums, and/or aluminum sulfate by primary curing of the compact obtained using the Hatschek sheet machine process, and then subjecting the compact to hydrothermal reaction. It is not desirable for the values shown in expression (2) to be less than 1 because adhesion between the layers of the film diminishes, and further, it is not desirable for the values shown in expression (2) to be greater than 10 because there is a tendency for the strength to decrease. Further, it is not desirable for the values shown in expression (3) to be less than 50 because adhesion between the layers of the film diminishes, and further, it is not desirable for the values shown in expression (3) to be greater than 400 because there is a tendency for the strength to decrease.

Calcium silicate boards manufactured according to the methods of manufacture as they relate to the first through fourth inventions of the present invention show extremely superior values for interlaminar peeling strength which is at least 3% of their flexural strength. Flexural strength has been evaluated according to JIS A 5418 using a No. 3 test piece, and tests for interlaminar peeling strength were carried out on a 30×30 mm test piece.

As can be seen from the above descriptions, using the method of manufacture for a calcium silicate board according to the present invention, it is possible to improve the overall strength and interlaminar strength of the compact before hydrothermal reaction if the compact is formed from a raw material slurry by the Hatschek sheet machine process, and thus it is possible to prevent peeling and bursting of the compact during hydrothermal reaction as well as to improve the interlaminar peeling strength of the calcium silicate board thus obtained.

EXAMPLES

Example 1

Materials were blended in the ratios shown in Table 1, mixed with 12 times as much water and stirred. The gel was synthesized from 10 percent by weight of slaked lime and 10 percent by weight of diatomaceous earth (weight ratio 1:1) at 90° C. for 2 hours. Water was further added to the mixture thus obtained to form a raw material slurry with a solid content of 3 percent by weight, and compacts were extracted to a thickness of 6 mm.

Next, the obtained compacts (green sheets) were subjected to primary curing in a moist atmosphere under the conditions shown in Table 1, then subjected to hydrothermal reaction in saturated water vapor in a pressure vessel at 180° C. for 10 hours.

Table 1 shows the bulk specific gravity, flexural strength, and interlaminar peeling strength (all in absolute dry condition) after hydrothermal reaction.

In the subject example, the Blaine specific surface area of Alunite #1 was 10200 $cm^2/g$, the Blaine specific surface area of Alunite #2 was 3720 $cm^2/g$, the Blaine specific surface area of Alum #1 was 4260 $cm^2/g$, the Blaine specific surface area of Alum #2 was 3150 $cm^2/g$, the Blaine specific surface area of Aluminum Sulfate #1 was 2630 $cm^2/g$, and the Blaine specific surface area of Aluminum Sulfate #2 was 1840 $cm^2/g$.

TABLE 1

| | Examples | | | | Comparative Examples | | | | | | |
|---|---|---|---|---|---|---|---|---|---|---|---|
| | 1 | 2 | 3 | 4 | 1 | 2 | 3 | 4 | 5 | 6 | 7 |
| Blending Ratio (wt %): | | | | | | | | | | | |
| Slaked lime | 31 | 25 | 27 | 29 | 32 | 20 | 27 | 29 | 31 | 30 | 31 |
| Silica sand | 30 | 24 | 27 | 28 | 31 | 19 | 27 | 28 | 30 | 29 | 30 |
| Gel | 20 | 20 | 20 | 20 | 20 | 20 | 20 | 20 | 20 | 20 | 20 |
| Wollastonite | 10 | 10 | 10 | 10 | 10 | 10 | 10 | 10 | 10 | 10 | 10 |
| Pulp | 5 | 5 | 5 | 5 | 5 | 5 | 5 | 5 | 5 | 5 | 5 |
| Glass fiber | 1 | 1 | 1 | 1 | 1 | 1 | 1 | 1 | 1 | 1 | 1 |
| Alunite #1 | 3 | — | — | 1 | 1 | — | — | 1 | — | — | — |
| Alunite #2 | — | — | — | — | — | — | — | — | 3 | — | — |
| Alum #1 | — | 15 | — | 6 | — | 25 | — | 6 | — | — | — |
| Alum #2 | — | — | — | — | — | — | — | — | — | 5 | — |
| Aluminum Sulfate #1 | — | — | 10 | — | — | — | 10 | — | — | — | — |
| Aluminum Sulfate #2 | — | — | — | — | — | — | — | — | — | — | 3 |
| Primary Curing: | | | | | | | | | | | |
| Temp. (° C.) | 50 | 30 | 80 | 50 | 50 | 30 | 30 | 50 | 50 | 30 | 80 |
| Time (hrs) | 6 | 8 | 6 | 6 | 6 | 8 | 6 | 3 | 6 | 8 | 6 |
| Value for Equation (1) | 210 | 120 | 390 | 210 | 210 | 120 | 90 | 105 | 210 | 120 | 390 |
| Bulk specific gravity | 0.63 | 0.62 | 0.63 | 0.64 | 0.62 | 0.63 | 0.61 | 0.61 | 0.62 | 0.63 | 0.63 |
| Flexural strength ($kg/cm^2$)*1 | 98 | 93 | 94 | 98 | 82 | 71 | 74 | 78 | 73 | 82 | 78 |
| Interlaminar peeling strength ($kg/cm^2$)*2 | 7.1 | 8.5 | 9.3 | 9.1 | 1.4 | 8.8 | 1.1 | 0.9 | 1.0 | 2.2 | 1.8 |
| *2/*1 × 100 | 7.2 | 9.1 | 9.9 | 9.3 | 1.7 | 12.4 | 1.5 | 1.2 | 1.4 | 2.7 | 2.3 |
| Peeling during hydrothermal reaction | No | No | No | No | Yes | No | Yes | Yes | Yes | Yes | Yes |

Example 2

Materials were blended in the ratios shown in Table 2, mixed with 12 times as much water and stirred. The gel was synthesized from 10 percent by weight of slaked lime and 10 percent by weight of diatomaceous earth (weight ratio 1:1) at 90° C. for 2 hours. Water was further added to the mixture thus obtained to form a raw material slurry with a solid content of 3 percent by weight. In addition, a different slurry with a solid content of 10 percent by weight prepared as described in Table 2 was used in the first slurry tank (shown as a 1 in Table 2) and/or the last slurry tank (shown as a 4 in Table 2) and compacts were extracted to a thickness of 6 mm.

Next, the obtained compacts (green sheets) were subjected to primary curing in a moist atmosphere under the conditions shown in Table 2, then subjected to hydrothermal reaction in saturated water vapor in a pressure vessel at 180° C. for 10 hours.

Table 2 shows the bulk specific gravity, flexural strength, and interlaminar peeling strength (all in absolute dry condition) after hydrothermal reaction.

In the subject example, the Blaine specific surface area of the alunite was 10200 cm$^2$/g, the Blaine specific surface area of the alum was 4260 cm$^2$/g, and the Blaine specific surface area of the aluminum Sulfate was 2630 cm$^2$/g.

TABLE 2

|  | Examples | | | | Comparative Examples | | |
| --- | --- | --- | --- | --- | --- | --- | --- |
|  | 1 | 2 | 3 | 4 | 1 | 2 | 3 |
| Blending Ratio (wt %): | | | | | | | |
| Slaked lime | 32 | 32 | 32 | 32 | 32 | 32 | 32 |
| Silica sand | 31 | 31 | 31 | 31 | 31 | 31 | 32 |
| Gel | 20 | 20 | 20 | 20 | 20 | 20 | 20 |
| Wollastonite | 10 | 10 | 10 | 10 | 10 | 10 | 10 |
| Pulp | 6 | 6 | 6 | 6 | 6 | 6 | 6 |
| Glass fiber | 1 | 1 | 1 | 1 | 1 | 1 | 1 |
| Blending Ratio in first and/or last slurry tank (wt %): | | | | | | | |
| Slurry tank No | 1&4 | 1 | 4 | 4 | 1&4 | 1 | 4 |
| Alunite | 3 | — | — | 5 | 1 | — | — |
| Alum | — | 15 | — | 5 | — | 25 | — |
| Aluminum Sulfate | — | — | 10 | — | — | — | 10 |
| Slaked lime | 31 | 27 | 28.5 | 28.5 | 31.5 | 24 | 28.5 |
| Silica sand | 30 | 26.5 | 28 | 28 | 30.5 | 23.5 | 28 |
| Gel | 19.5 | 17 | 18 | 18 | 20 | 15 | 18 |
| Wollastonite | 9.5 | 8.5 | 9 | 9 | 10 | 7.5 | 9 |
| Pulp | 6 | 5 | 5.5 | 5.5 | 6 | 4.5 | 5.5 |
| Glass fiber | 1 | 1 | 1 | 1 | 1 | 0.5 | 1 |
| Primary Curing: | | | | | | | |
| Temp. (° C.) | 50 | 30 | 80 | 30 | 50 | 30 | 30 |
| Time (hrs) | 6 | 8 | 6 | 8 | 6 | 8 | 6 |
| Value for Equation (1) | 210 | 120 | 390 | 120 | 210 | 120 | 90 |
| Bulk specific gravity | 0.63 | 0.61 | 0.61 | 0.63 | 0.64 | 0.61 | 0.63 |
| Flexural strength (kg/cm$^2$)*1 | 102 | 87 | 92 | 96 | 75 | 72 | 81 |
| Interlaminar peeling strength (kg/cm$^2$)*2 | 7.2 | 6.9 | 6.6 | 7.1 | 1.2 | 9.0 | 11 |
| *2/*1 × 100 | 7.1 | 7.9 | 7.2 | 7.4 | 1.6 | 12.5 | 1.4 |
| Peeling during hydrothermal reaction | No | No | No | No | Yes | No | Yes |

Example 3

Materials were blended in the ratios shown in Table 3, mixed with 12 times as much water and stirred. The gel was synthesized from 10 percent by weight of slaked lime and 10 percent by weight of diatomaceous earth (weight ratio 1:1) at 90° C. for 2 hours. Water was further added to the mixture thus obtained to form a raw material slurry with a solid content of 3 percent by weight, and compacts were extracted to a thickness of 6 mm. During extraction, alunite, alum and aluminum sulfate were applied to the extracted film between the return roll and the making roll in a powder or slurry form in the amounts shown in Table 3. The slurry used had a solid content of 10 percent by weight.

Next, the obtained compacts (green sheets) were subjected to primary curing in a moist atmosphere under the conditions shown in Table 3, then subjected to hydrothermal reaction in saturated water vapor in a pressure vessel at 180° C. for 10 hours.

Table 3 shows the bulk specific gravity, flexural strength, and interlaminar peeling strength (all in absolute dry condition) after hydrothermal reaction.

In the subject example, the Blaine specific surface area of the alunite was 10200 cm$^2$/g, the Blaine specific surface area of the alum was 4260 cm$^2$/g, and the Blaine specific surface area of the aluminum Sulfate was 2630 cm$^2$/g.

TABLE 3

|  | Examples | | | | Comparative Examples | | |
| --- | --- | --- | --- | --- | --- | --- | --- |
|  | 1 | 2 | 3 | 4 | 1 | 2 | 3 |
| Blending Ratio (wt %): | | | | | | | |
| Slaked lime | 32 | 32 | 32 | 32 | 32 | 32 | 32 |
| Silica sand | 32 | 32 | 32 | 32 | 32 | 32 | 32 |
| Gel | 20 | 20 | 20 | 20 | 20 | 20 | 20 |
| Wollastonite | 10 | 10 | 10 | 10 | 10 | 10 | 10 |
| Pulp | 5 | 5 | 5 | 5 | 5 | 5 | 5 |
| Glass fiber | 1 | 1 | 1 | 1 | 1 | 1 | 1 |
| Application condition: | | | | | | | |
| (P = powder; S = slurry) | P | S | P | P | P | S | P |
| Alunite (g/m$^2$) | 3 | — | — | 10 | 3 | — | — |
| Alum (g/m$^2$) | — | 10 | — | 10 | — | 1 | — |
| Aluminum Sulfate | — | — | 40 | — | — | — | 60 |
| Primary Curing: | | | | | | | |
| Temp. (° C.) | 50 | 50 | 30 | 50 | 30 | 50 | 30 |
| Time (hrs) | 6 | 6 | 8 | 6 | 6 | 6 | 8 |
| Value for Equation (1) | 210 | 210 | 120 | 210 | 90 | 210 | 120 |
| Bulk specific gravity | 0.63 | 0.62 | 0.64 | 0.63 | 0.61 | 0.62 | 0.65 |
| Flexural strength (kg/cm$^2$)*1 | 97 | 90 | 82 | 86 | 74 | 75 | 70 |
| Interlaminar peeling strength (kg/cm$^2$)*2 | 6.9 | 7.8 | 8.0 | 7.1 | 1.1 | 0.9 | 4.2 |
| *2/*1 × 100 | 7.1 | 8.7 | 9.8 | 8.3 | 1.5 | 1.2 | 6.0 |
| Peeling during hydrothermal reaction | No | No | No | No | Yes | Yes | No |
| Cracked when dry | No | No | No | No | No | No | Yes |

Example 4

Materials were blended in the ratios shown in Table 4, mixed with 12 times as much water and stirred. The gel was synthesized from 10 percent by weight of slaked lime and 10 percent by weight of diatomaceous earth (weight ratio 1:1) at 90° C. for 2 hours. Water was further added to the mixture thus obtained to form a raw material slurry with a solid content of 3 percent by weight. In addition, a raw material slurry with a solid content of approx. 2 percent by weight was blended and mixed in the same way and placed in either the first or the last slurry tank, and compacts were extracted to a thickness of 6 mm.

Next, the obtained compacts (green sheets) were subjected to primary curing in a moist atmosphere under the conditions shown in Table 4, then subjected to hydrothermal reaction in saturated water vapor in a pressure vessel at 180° C. for 10 hours.

Table 4 shows the bulk specific gravity, flexural strength, and interlaminar peeling strength (all in absolute dry condition) after hydrothermal reaction.

In the subject example, the Blaine specific surface area of the alunite was 10200 cm$^2$/g the Blaine specific surface area of the alum was 4260 cm$^2$/g, and the Blaine specific surface area of the aluminum Sulfate was 2630 cm$^2$/g.

TABLE 4

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Blending Ratio (wt %): | | | | | | | | |
| Slaked lime | 32 | 32 | 32 | 32 | 32 | 32 | 32 | 32 |
| Silica sand | 32 | 32 | 32 | 32 | 32 | 32 | 32 | 32 |
| Gel | 20 | 20 | 20 | 20 | 20 | 20 | 20 | 20 |
| Wollastonite | 10 | 10 | 10 | 10 | 10 | 10 | 10 | 10 |
| Pulp | 5 | 5 | 5 | 5 | 5 | 5 | 5 | 5 |
| Glass fiber | 1 | 1 | 1 | 1 | 1 | 1 | 1 | 1 |
| Blending Ratio in first or fourth slurry tank (wt %): | | | | | | | | |
| Slurry tank No. | 4 | 4 | 1 | 4 | 4 | 4 | 1 | 4 |
| Alunite | — | 40 | — | 35 | — | 40 | — | 35 |
| Alum | 95 | — | — | 35 | 95 | — | — | 35 |
| Aluminum Sulfate | — | — | 22 | — | — | — | 22 | — |
| Slaked lime | — | 53 | 25 | — | — | 53 | 25 | — |
| Calcium carbonate | — | — | 50 | 25 | — | — | 50 | 25 |
| Pulp | 5 | 7 | 3 | 5 | 5 | 7 | 3 | — |
| Value for equation (2) | 3 | 1.5 | 8 | 5 | 3 | 0.5 | 12 | 6 |

TABLE 4-continued

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Ratio of curing agent (%) | 95 | 40 | 22 | 70 | 95 | 40 | 22 | 70 |
| Value for equation (3) | 285 | 60 | 176 | 350 | 285 | 20 | 264 | 420 |
| Primary Curing: | | | | | | | | |
| Temp. (° C.) | 30 | 50 | 50 | 30 | 30 | 50 | 50 | 30 |
| Time (hrs) | 8 | 6 | 6 | 8 | 6 | 6 | 6 | 8 |
| Value for Equation (1) | 120 | 210 | 120 | 120 | 90 | 210 | 210 | 120 |
| Bulk specific gravity | 0.63 | 0.63 | 0.65 | 0.64 | 0.62 | 0.63 | 0.63 | 0.64 |
| Flexural strength (kg/cm$^2$)*1 | 93 | 98 | 87 | 89 | 81 | 72 | 67 | 73 |
| Interlaminar peeling strength (kg/cm$^2$)*2 | 7.8 | 7.5 | 6.1 | 8.0 | 1.2 | 1.0 | 3.0 | 5.8 |
| *2/*1 × 100 | 8.4 | 7.7 | 7.0 | 9.0 | 1.5 | 1.4 | 4.5 | 7.9 |
| Peeling during hydrothermal reaction | No | No | No | No | Yes | Yes | No | Yes |

What is claimed is:

1. A lightweight calcium silicate board wherein it is a calcium silicate board manufactured according to a manufacturing method using the Hatschek sheet machine process, which comprises subjecting to primary curing and thereafter hydrothermally reacting in a pressure vessel a compact obtained by repeatedly laminating raw material slurry present in a series of slurry tanks, each of which contains a rotatable cylinder disposes therein, by means of said cylinders, onto a continuous felt support to form an extracted film on the continuous felt support and then winding the extracted film around a roll functioning as a making roll to form the compact, the raw material slurry containing as it solid content 17 to 50 percent by weight of calcarous material, 15 to 45 percent by weight of siliceous material, 2 to 8 percent by weight of fibrous material, and 5 to 40 percent by weight of inorganic fillers, wherein the raw material slurry also contains 2 to 20 percent by weight of one or more species selected from alunites and alums with a Blaine specific surface area of 4000 cm$^2$/g or more or aluminum sulfate with a Blaine specific surface area of 2000 cm$^2$/g or more, and the compact is subjected to primary curing under conditions where $$(\text{curing temperature}-15\%\text{C.})\times\text{curing time} \geq 120° \text{ C.·hr} \quad (1)$$

and its interlaminar peeling strength is at least 3% of its flexural strength.

* * * * *